Figure 1:
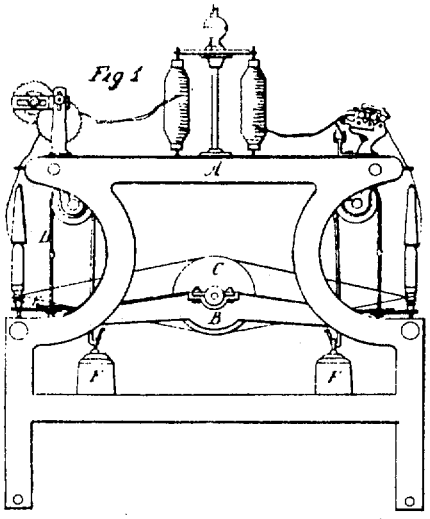
Figure 5:
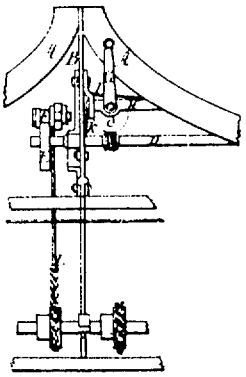
Figure 7:
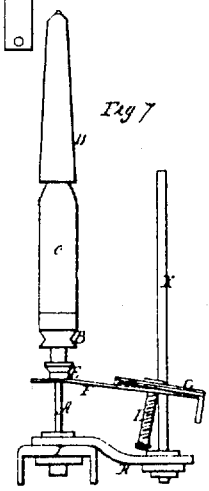
Figure 3:
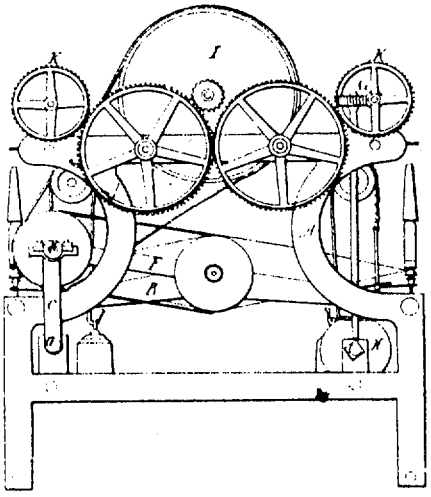
Figure 4:
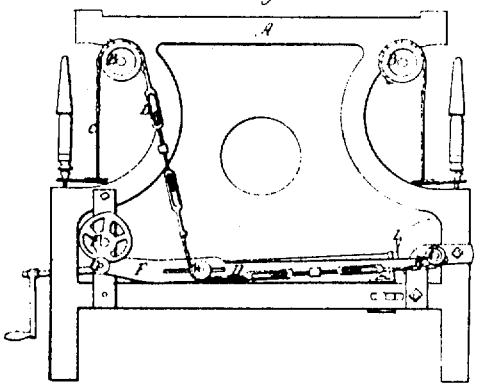

5896x

C. Danforth

Spinning Mach.

Patented Apr. 1, 1830.

Inventor

No Printed Specification Available
5896X
Sheet 2, 2 Sheets
C. Danforth.
Spinning Mach.
Patented Apr. 1, 1830.
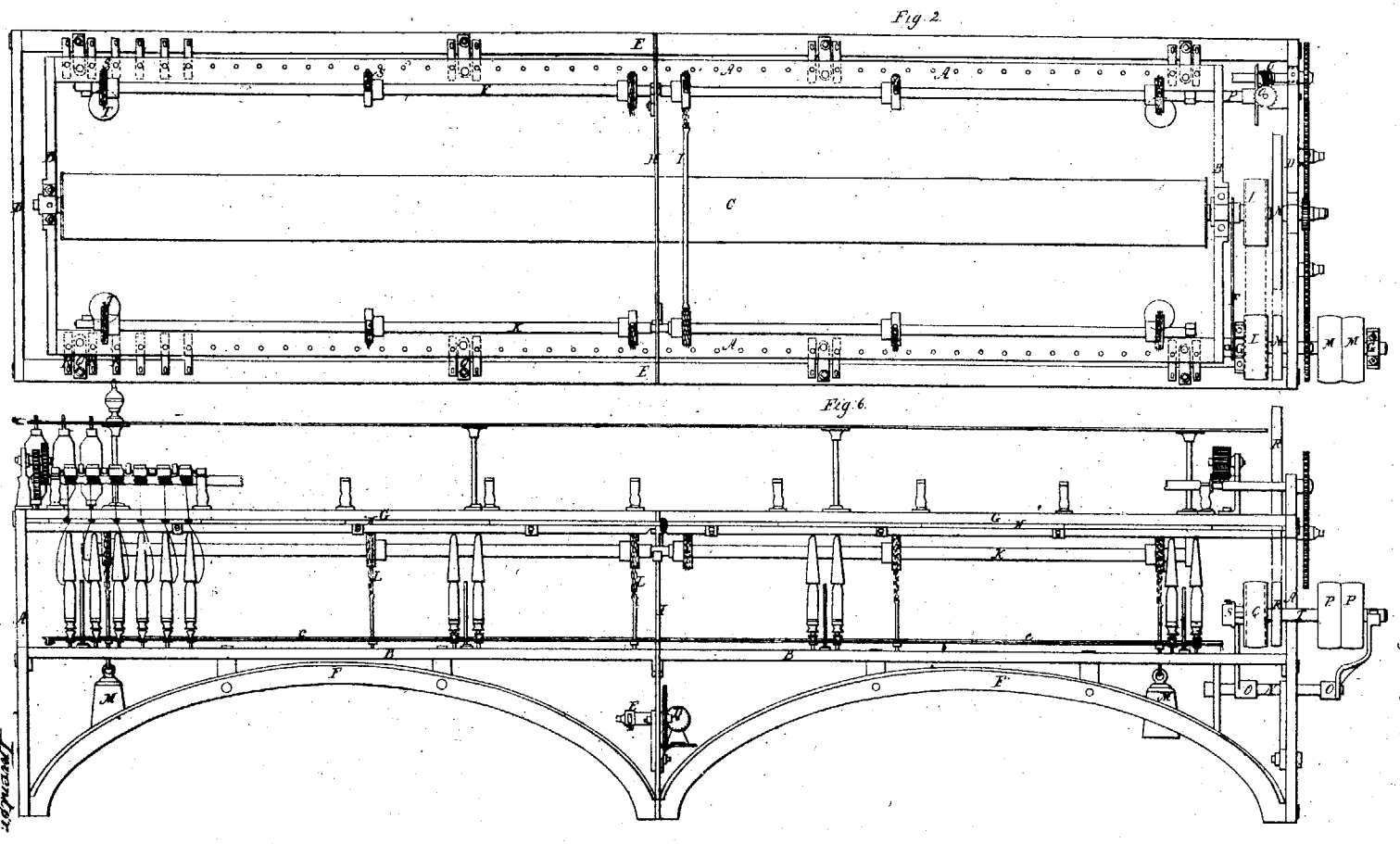
Inventor.
Chas. Danforth

[illegible] Apr. 11, 18[illegible]

Charles Danforth of Patterson New Jersey

Letters Patent.

The Schedule referred to in these Letters Patent and making part of the same containing a description in the words of the said Charles Danforth himself of his improvement in the Spinning machine commonly known by the name of Danforths Patent Throstle, To all whom these presents shall come. Be it known that I Charles Danforth of Paterson in the County of Essex and State of New Jersey have invented a new and useful improvement on a spinning machine for Spinning Cotton commonly known by the name of Danforths Patent throstle for which Throstle I obtained Letters Patent September 3rd A.D. One thousand Eight hundred and twenty eight under the name of the Immoveable flyer and that the following is a full and exact description of the said improvement as invented by me. It consists of an improvement by which the cylinder made use of for driving the [illegible] & Bobbins instead of revolving in fixed or stationary bearings is made to traverse with the traverse rails & [illegible] whereby the tension of the bands is kept the same when the rails are up in the centre or at the bottom. It also consists in dropping or lowering the [illegible] and Bobbin for the convenience of piecing or mending the broken ends or threads. This invention or improvement I call the traversing cylinder and drop bobbin. The cylinder is made to traverse by the same apparatus which gives motion to the rails instead of having the cylinder bearings fastened to the ends of the frame as is the case on the ordinary Throstle. there is a bar of cast iron running across the frame from one traverse rail to the other, the ends of this bar are bolted fast to a flange on the end of the traverse rails. there is a bar of this kind at each end of the traverse rails. in the centre of which bars the bearings for the journals of the cylinder are fixed so that as the rails rise and fall the cylinder rises and falls with them. The contrivance for [illegible] or traversing the cylinder is as follows viz. There is a shaft [illegible] [illegible] inches long by one and a quarter inch diameter, confined to bearings four inches back of the front of the frame [illegible] inches from the [illegible] of the frame and about [illegible] inches lower than the centre of the cylinder when the cylinder and rails are in the centre of their [illegible] or when the bobbins
are half full. this shaft runs parallel with the cylinder to which shaft is
firmly fixed two stands or arms in an upright position about ten inches
long and of a size sufficient to prevent the straps of the belt from spring-
ing them; at the tops of these stands are fixed bearings for a counter or
driving shaft. this shaft it will be seen runs parallel with the cylinder
and is on a level with it when the cylinder as before stated is in the cen-
tre. on the end of this counter shaft are the fast and loose pullies by
which motion is communicated to the whole machinery and on the other is
a pulley that gives motion to the cylinder by a belt running from said
pulley round a pulley on the end of the cylinder. the rollers are turned
by this same counter shaft by means of a belt or gearing. there is a
connecting or pitman Rod running from the cylinder journal to the journal
of this counter shaft. having a hub on each end these hubs are perforated
or drilled thro which the journal of the cylinder and the journal of the
counter shaft passes. These hubs serve as a bearing for the cylinder journal
at one end. and for a bearing for one end of the counter shaft. the out_side
surface of these hubs are turned and grooved out to suit a socket and
cap box in the cross bar and on one of the stands above written of. The use
of this connecting or pitman rod is to steady the counter or driving shaft
and to keep it always the same distance from the cylinder. so that the
cylinder belt will be of the same tightness when the rails are up as when the
rails are down. The apparatus for dropping the washers and bobbins is
as follows Viz. The traverse rails instead of traversing on the spindle
or having the spindle pass thro them (as in the case with the ordinary
kind) are placed about three inches back of the spindle. the rails are made
of cast iron about three inches wide. and about a quarter of an inch thick
having a rib or stiffener on the backside about one inch deep. on the front
is a rib about one sixteenth of an inch deep for the levers hereafter spoken
of to rest against. The levers are made of rolled iron about three quarters
of an inch wide and about one eighth of an inch in thickness. they are long
enough to extend from the back rib or stiffener on the rail to about half
an inch in front of the spindle. they are fixed to the [illegible] [illegible] of the traverse

[illegible] by means of a bolt about three inches long and one quarter of an inch diameter, passing thro the front of the rails and a hole in or near the cen-tre of the lever made for the purpose. On this bolt is a spiral spring made of about number eighteen wire about one and half inch long. this spring is regulated by a nut screwed on the bottom of said bolt. the use of the spring is to keep the lever hard up against the lower side of the rails. there is a slot made thro the front end of the lever thro which the spin-dles pass and the washers which run on the spindle rest on this lever and of consequence traverse with the lever and rails. when an end breaks this lever is forced down the spiral spring [illegible] when the end being obtain-ed the lever is let go. it assumes it place and the end is pieced The same effect of dropping the bobbin is done by means of a weight and lever. that is done with a spring. What I claim as my invention is the traversing of the cylinder with the rails and the dropping the bobbins for the convenience of piecing in all and every mode whatever on the above Throstle.

Recd 1826

Charles Danforth

Witnesses
J M V^n Winkle
I M Crismond

1202